Sept. 4, 1934.  W. MELAS  1,972,713

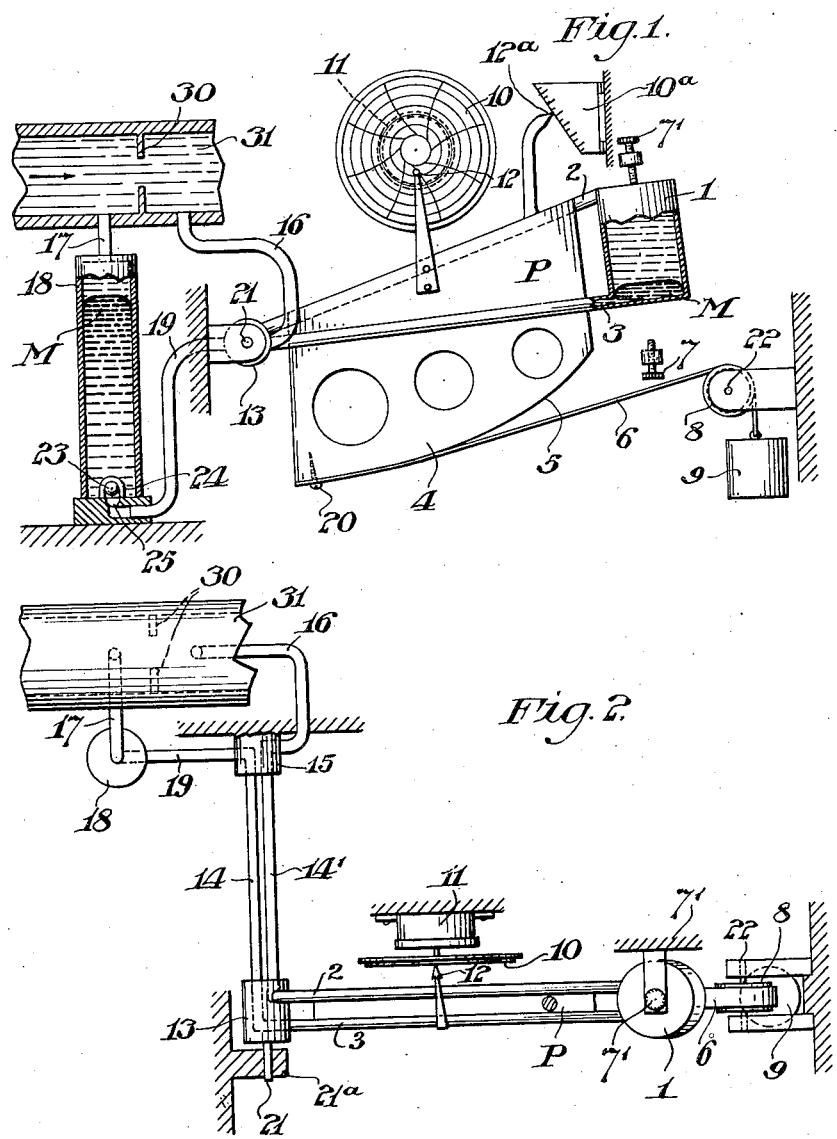

FLOW MEASURING APPARATUS

Filed April 16, 1931  2 Sheets-Sheet 2

Patented Sept. 4, 1934

1,972,713

UNITED STATES PATENT OFFICE 1,972,713

FLOW MEASURING APPARATUS

William Melas, Philadelphia, Pa., assignor to Cochrane Corporation, Philadelphia, Pa., a corporation of Pennsylvania Application April 16, 1931, Serial No. 530,481

6 Claims. (Cl. 73—167)

My invention relates to measuring apparatus and particularly to meters for indicating or recording the rate of flow of fluids.

In accordance with my invention, pivoted structure is subjected to opposing forces, one of which is produced by a pressure differential whose magnitude is determined by the rate of flow of a fluid, and the other of which is produced by a weight acting through a lever arm of variable effective length, so that for equal increments of rate of flow, the pivoted member moves to equal extents from one position at which the forces are balanced to another balanced position.

More particularly, the movement of the pivoted member is transmitted to an indicating pointer, or recorder stylus, cooperating with a scale or chart having uniformly spaced graduations and calibrated in units of or related to rate of flow.

My invention further resides in the features of construction, arrangement and combination hereinafter described and claimed.

For an understanding of my invention and for illustration of some of the forms it may take, reference is to be had to the accompanying drawings in which:

Figs. 1 and 2 are front elevation and plan views respectively of my preferred apparatus in diagrammatic form.

Figure 3:
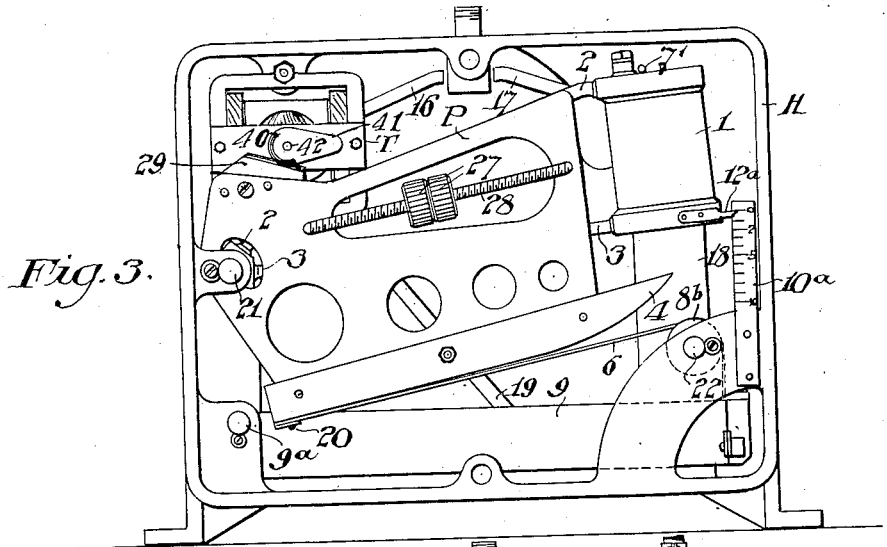
Figure 4:
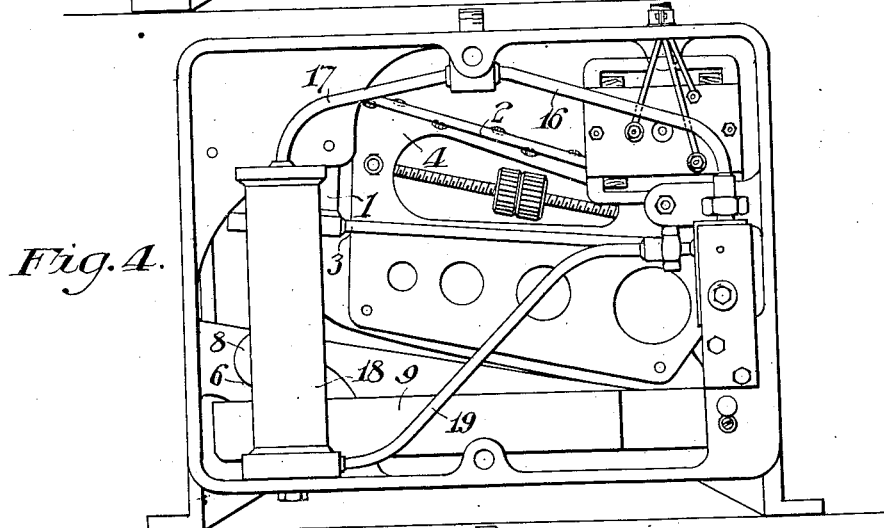
Figure 5:
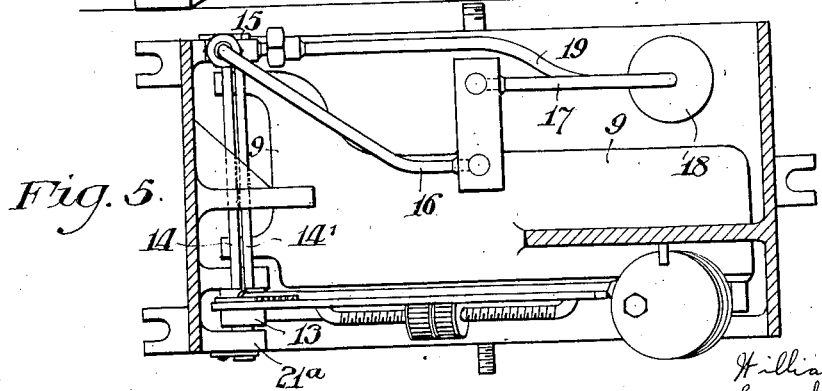

Figs. 3, 4, and 5 are front, back and plan views respectively of the apparatus as actually constructed.

Referring to Fig. 1 the hollow, wholly enclosed chamber 1 is in communication with the tubes 2 and 3 at its top and bottom respectively. The tubes extend to the supporting member 13 provided with a shaft 21 rotatable in a bearing 21a, and are in communication respectively with the thin walled, torsionally flexible tubes 14, 14' which are equally disposed on opposite sides of the axis of rotation of the member 13. The opposite ends of the tubes are suitably fastened to a stationary member 15 which is provided with passages placing the tubes 14, 14' into communication respectively with one end of the tubes or pipes 19, 16. The other end of tube 16 opens into a conduit or pipe 31 on the down-stream side of an orifice plate 30, or equivalent. On the up-stream side of the orifice plate, the conduit 31 is in communication with the tube 17 connected to the top of a cylinder 18 to the bottom of which is connected the tube 19.

The chamber 1, cylinder 18, and tubes 3, 14 and 19 contain a liquid, as mercury M, having a greater specific gravity than the fluid passing through the main or pipe 31. As the flow of fluid through the conduit changes, the difference between the pressures on opposite sides of the orifice plate will change in accordance with the second power of the rate of flow. Assuming that the rate of flow increases, for example, the difference between the pressure on the mercury M in the cylinder 18 and the pressure on the other end of the mercury column in chamber 1 increases and consequently the mercury is displaced to greater or less extent in cylinder 18 and rises in chamber 1 producing a force tending to effect clock-wise rotation of the pivoted structure P comprising the chamber 1, tubes 2, 3, and supporting member 13. The thin-walled tubes 14, 14' twist above their axes and allow free movement of the pivoted assembly.

The force produced by the pressure differential across the orifice and tending to effect clockwise rotation of the structure is balanced by a force produced by the counter weight 9 which is connected to the movable structure by a flexible cord or ribbon 6 which passes over the pulley 8, free to revolve about its axis 22. Specifically an end of the strap or ribbon 6 is anchored or secured, as by the bolt 20, to a cam plate 4, connected to and depending from the pivoted structure.

As the pressure differential increases to cause clockwise movement of the pivoted structure, the ribbon 6 engages the lower curved face of the cam plate at points more and more remote from the pivotal axis 21 of the pivoted structure P, so that in effect the counter weight acts through a lever arm whose length varies with the position of the pivoted structure, and more specifically a lever arm whose length increases as the pivoted structure moves clockwise from the position shown. Otherwise stated, the moment of the force produced by the weight varies with the position of the pivoted structure P, and substantially in accordance with the second power, or square law. The cam face is so shaped that the movement of the pivoted structure is proportional to the square root of the differential pressure and directly proportional to rate of flow. Accordingly, an indicating pointer 12a actuated by or mounted upon the pivoted structure, moves throughout the range of the measuring device, to equal extents for equal increments of rate of flow. The scale 10a cooperating with the pointer may therefore be uniformly graduated in units related to rate of flow; that is, the divisions of the scale will be equally spaced throughout its length, since the movement of the pointer 12a is a linear function of rate of flow. Similarly the recorder chart or scale 10 driven by suitable clockwork mechanism 11, or equivalent, may be uniformly divided in units of rate of flow since the recorder stylus 12 is connected to or movable with the pivoted structure P whose movement is directly proportional to rate of flow.

The stop 7' determines the position of the pivoted structure P when the rate of flow is zero. Both the upper stop 7' and the lower stop 7 limit the range of movement of the pivoted structure so that the torsional stresses in the tubes 14, 14' do not exceed the elastic limit of the material of which the tubes are made.

To prevent loss of the mercury M, or equivalent, when the differential pressure is in excess of that for which the apparatus is designed, by escape through the tubes 14', and 16 into the conduit 31, there is provided a check valve in the base of cylinder 18. The ball 23 is of a material whose specific gravity is less than that of the gage liquid M. When the level of the mercury, or other suitable gage liquid, is above the conical seat 25, the ball 23 bears against the top of the valve cage 24, allowing free passage through the tube 19 but when excessive pressure is applied to the chamber 18 so that the level of the gage liquid reaches the conical seat 25, the ball 23 drops on the seat shutting off communication between the chamber 18 and tube 19 until the pressure differential decreases to within the normal range of the apparatus.

The commercial form of the apparatus, which is shown in Figs. 3 to 5 corresponds closely to the diagrammatic showing of Figs. 1 and 2 and the same reference characters have been used for corresponding elements. In Figs. 3 to 5 all of the apparatus shown in Fig. 1 with the exception of the conduit or main through which the fluid under measurement is flowing, is contained within a housing H. The front and back covers of the housing have been omitted clearly to show the apparatus. For compactness, the weight 9 is pivoted at 9a, and the free end of the weight is connected as shown most clearly in Fig. 4, to the end of strap 6 depending from the pulley 8b. For nicety of adjustment, the weights 27 may be adjusted along the bar 28 which is fastened to the pivoted structure P, to vary their distance from the pivot 21.

Further, in the apparatus in Figs. 3 to 5 the plate 4 carries a gear segment 29 meshing with a gear segment 40, of a member 41 rotatable about axis 42. The member 41 is associated with electrical telemetric apparatus T for producing at a remote point indications of rate of flow. The angular movement of member 41 is a linear function of rate of flow. If desired, a circular scale may be associated with the member 41, and the graduations of the scale would be uniformly spaced.

The apparatus is of rugged, compact and simple construction and does not require precise leveling of the housing for accurate readings. It may be used therefore in locations where other more delicate, yet no more accurate or sensitive apparatus, could not be employed.

While preferred embodiments of my invention have been specifically illustrated, it will be understood that substantial variation may be made in the form of apparatus without departing from the spirit of my invention, as expressed in the appended claims.

What I claim is:

1. Flow measuring apparatus comprising a fixed chamber containing gage liquid, pivoted structure carrying a chamber containing gage liquid and movable with said structure, conduit structure interconnecting said chambers, means responsive to variations in rate of flow of the measured fluid for varying the amount of gage liquid in said movable chamber to produce a force tending to effect movement of said structure in one direction and varying non-linearly with rate of flow, and means for ensuring equal increments of movement of said pivoted structure for equal increments of rate of flow and comprising a movable weight producing a second force tending to effect movement of said structure in the opposite direction, and a cam plate movable with said structure for varying the moment of said second force for different positions of said pivoted structure.

2. Flow measuring apparatus comprising a fixed chamber containing liquid, pivoted structure including a second chamber containing liquid, conduit structure interconnecting said chambers, means producing a differential pressure varying substantially as the second power of the rate of flow, means including the liquid in said chambers responsive to changes in magnitude of said differential pressure for varying correspondingly the magnitude of a force tending to effect movement of said pivoted structure in one direction, and means for ensuring equal movements of said structure for equal increments of rate of flow and comprising a weight producing a force opposing said first force, and cam structure for varying the moment of said second force substantially in accordance with the second power for different positions of said member.

3. Flow measuring apparatus comprising a pivoted structure including a chamber containing gage liquid, a pivoted supporting member, a fixed chamber containing gage liquid, tubes extending from said supporting member to the top and bottom of said first-named chamber respectively and to said fixed chamber, and thin walled torsional tubes in communication with said tubes and extending parallel to and equally spaced on opposite sides of the axis of rotation of said member, means responsive to variations in rate of flow of the measured fluid for varying the amount of gage fluid in said first-named chamber to produce a force tending to effect movement of said pivoted structure in one direction and varying non-linearly with rate of flow, cam structure movable with said pivoted structure, a weight, movable with said pivoted structure, a weight, and a flexible member connecting said weight to said cam structure and cooperating therewith to vary the force produced by said weight in opposing said first force to ensure equal movements of said pivoted structure for equal increments of rate of flow, said fixed chamber and pivoted structure being positioned on the same side of said pivoted supporting member.

4. Flow measuring apparatus comprising a casing enclosing a movable chamber, a fixed reservoir, and a tube connecting said chamber and reservoir, the said chamber, reservoir, and tube containing gage liquid, means for applying differential pressures derived from the fluid under measurement to said chamber and reservoir, means pivotally supporting said tube intermediate its ends and supporting said movable chamber, said chamber and reservoir being disposed on the same side of said pivotal supporting means, a weight connected to said supporting means by a flexible connector, and cam structure carried by said supporting means and engaging said flexible connector at varying distances for different positions of said movable chamber.

5. Flow measuring apparatus comprising a casing enclosing a movable chamber, a fixed reservoir, and a tube connecting said chamber and reservoir, the said chamber, reservoir, and tube containing gage liquid, means for applying differential pressures derived from the fluid under measurement to said chamber and reservoir, means pivotally supporting said tube intermediate its ends and supporting said movable chamber, said pivotal supporting means being disposed adjacent one side of said casing, and said chamber and reservoir disposed adjacent the opposite side of the casing from said pivotal supporting means, a weight pivoted adjacent said one side of said casing, a flexible connector from said weight to said supporting means, and cam structure extending toward said opposite side of said casing and engaging said flexible connector at varying distances for different positions of said movable chamber.

6. Flow measuring apparatus comprising a housing, structure pivotally mounted in said housing and including a chamber, a fixed reservoir within the housing, a tube connecting said chamber and reservoir, a pivoted supporting member intermediate the ends of said tube, said tube having a thin-walled torsional portion adjacent said pivoted supporting member, a stationary support within said housing for the end of said torsional tube remote from said pivoted supporting member, tubes in communication with the said chamber and reservoir for connection to a differential pressure device, a cam movable with said structure, a weight pivotally mounted in said housing, and a flexible member connecting said weight to said cam and cooperating therewith to vary the biasing effect of said weight on said pivoted structure, said pivoted supporting means being positioned adjacent one side of the housing, and said chamber, reservoir, and weight positioned adjacent the opposite side of the housing.

WILLIAM MELAS.